United States Patent [19]

Minami et al.

[11] 4,081,430

[45] Mar. 28, 1978

[54] AROMATIC POLYAMIDE CRYSTALLINE COMPLEX AND THE METHOD FOR PRODUCING THE SAME

[75] Inventors: Shunsuke Minami; Hideto Kakida; Jun Nakauchi, all of Ohtake, Japan

[73] Assignee: Mitsubishi Rayon Co., Ltd., Tokyo, Japan

[21] Appl. No.: 734,009

[22] Filed: Oct. 19, 1976

[30] Foreign Application Priority Data

Oct. 20, 1975  Japan ................................ 50-126205
Feb. 20, 1976  Japan ................................ 51-17526

[51] Int. Cl.² ............................................. C08G 69/46
[52] U.S. Cl. ................... 260/78 S; 260/30.2; 260/30.6 R; 260/47 CZ; 260/78 SC
[58] Field of Search ................ 260/78 S, 78 SC, 78 R

[56] References Cited

U.S. PATENT DOCUMENTS

| | | | |
|---|---|---|---|
| 3,063,966 | 11/1962 | Kwolek et al. | 260/78 R |
| 3,068,188 | 12/1962 | Beste et al. | 260/78 R |
| 3,287,324 | 11/1966 | Sweeny | 260/78 R |
| 3,642,706 | 2/1972 | Morgan | 260/78 S |
| 3,953,401 | 4/1976 | Gabler et al. | 260/78 S |

*Primary Examiner*—Harold D. Anderson
*Attorney, Agent, or Firm*—Oblon, Fisher, Spivak, McClelland & Maier

[57] ABSTRACT

A novel aromatic polyamide crystalline complex capable of being molded at low temperatures is produced by contacting an aromatic polyamide in which at least 75 mol % of repeating unit comprises m-phenyleneisophthalamide with at least one member selected from the group consisting of hexamethylphosphoric amide, N-methyl-2-pyrrolidone, ε-caprolactam and 2-pyrrolidone to form a crystalline complex and then removing the hexamethylphosphoric amide, N-methyl-2-pyrrolidone, ε-caprolactam and 2-pyrrolidone which are not contained in the crystal.

18 Claims, 8 Drawing Figures

(a) HMPA CRYSTALLINE COMPLEX POWDER (b) PmIA POWDER (c) FIBROUS HMPA CRYSTALLINE COMPLEX (d) PmIA FIBER

AROMATIC POLYAMIDE CRYSTALLINE COMPLEX AND THE METHOD FOR PRODUCING THE SAME

BACKGROUND OF THE INVENTION

The present invention relates to a novel melt moldable aromatic polyamide crystalline complex and a method for producing the same.

Recently, aromatic polyamide molded into fibers, films, resins or papers are widely used for clothes, industrial materials, electric insulation, etc. because of their excellent heat resistance.

Hitherto, such aromatic polyamide cannot be melt molded because they have markedly high melting points. They have been molded into fibers, films or papers by once dissolving the polymers in polar organic solvents such as dimethylformamide, dimethylacetoamide, N-methyl-2-pyrrolidone, tetramethylurea, dimethylsulfoxide etc. and then extruding said polymer solution into a liquid bath or a gas stream from nozzles, dies or orifice to remove the solvent.

However, said method requires expensive organic solvents and moreover requires high cost for recovery of the solvent. Furthermore, the compression molding of fine powders of the polymer has been attempted as one of the molding method, but it has been difficult to produce uniform products.

Under the circumstance, the inventors have made intensive researches for molding aromatic polyamide at low temperatures without using the solvent in a large amount. As the results, it has been found that a novel compound capable of being melt molded at low temperatures can be produced by treating an aromatic polyamide with a special organic solvent.

SUMMARY OF THE INVENTION

That is, a novel aromatic polyamide crystalline complex is produced by contacting an aromatic polyamide in which at least 75 mol % of repeating unit comprises m-phenylene isophthalamide with at least one member selected from the group consisting of hexamethylphosphorin amide, N-methyl-2-pyrrolidone, $\epsilon$-caprolactam and 2-pyrrolidone to form a crystalline complex and then removing the excess solvent, hexamethylphosphoric amide, N-methyl-2-pyrrolidione, $\epsilon$-caprolactam and 2-pyrrolidone which are not contained in the crystal.

DESCRIPTION OF THE INVENTION

Figure 1:
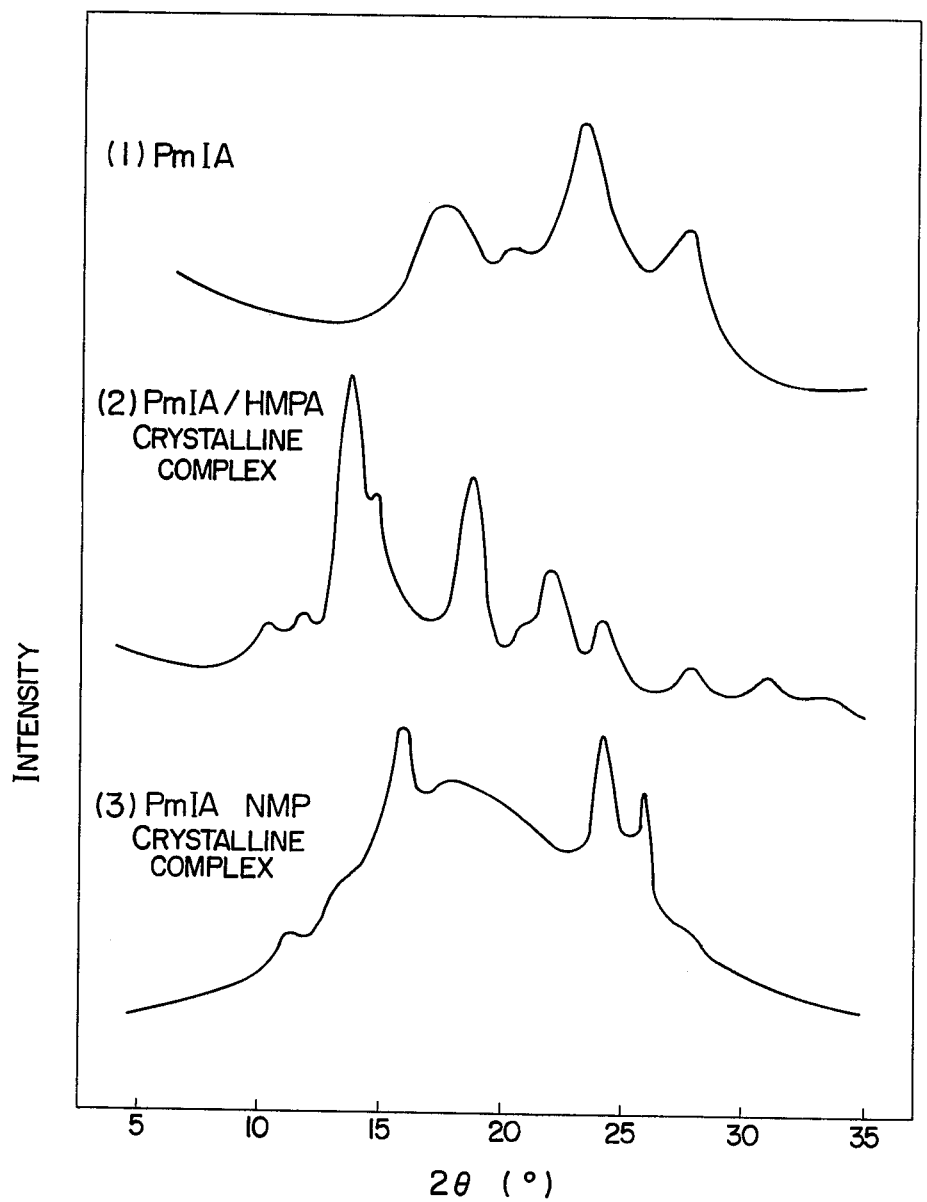
FIG. 1 shows X-ray diffraction patterns of crystalline complexes of the present invention and poly-m-phenyleneiisophthalamide.

The crystalline complex of the present invention is dry touch material and this novel crystalline complex is composed of poly-m-phenyleneisophthalamide and at least one member selected from the group consisting of hexamethylphosphoric amide, N-methyl-2-pyrrolidone, $\epsilon$-caprolactam and 2-pyrrolidone which coexist in the crystal lattice.

When the same treatment as mentioned above is conducted using dimethylacetamide, dimethylformamide, tetramethylurea, dimethylsulfoxide, etc. which are ordinarily used as solvents for poly-m-phenyleneisophthalamide, no formation of crystalline complex is recognized.

Such crystalline complex of the present invention has never been known and is utterly novel chemical substance.

The method for production of the crystalline complex of the present invention will be specifically disclosed below.

The organic solvents used for production of the crystalline complex are hexamethylphosphoric amide (abbreviated to "HMPA" hereinafter), N-methyl-2-pyrrolidone (abbreviated to "NMP" hereinafter), $\epsilon$-caprolactam (abbreviated to "$\epsilon$ CAP" hereinafter) and 2-pyrrolidone (abbreviated to "2P" hereinafter). These are preferably used alone, but may be used in admixture of two or more or in admixture with a small amount of other solvents such as benzene, methanol, dimethylformamide, dimethylacetamide, etc. which can be homogeneously mixed with HMPA, NMP, $\epsilon$ CAP or 2P.

The aromatic polyamide (which is abbreviated to "PmIA" in some places hereinafter) used is not especially limited in its form and can be used in any forms such as powders, undrawn or drawn fibers, films or resins. The degree of polymerization of the polymers is also not especially limited, but those of 1.5 – 5.5 in relative viscosity (The viscosity in this specification is measured at a concentration of 1.0 g in 100 cc of concentrated sulfuric acid at 25° C) are preferred.

Industrially, the polymers are preferably those which form the crystalline complex in a short period of time at a relatively low temperature and as such polymers those which have a density of not more than 1.39 g/cm$^3$ and which have not been subjected to such thermal history as higher than 350° C and more than 30 minutes are preferred.

Said aromatic polyamides are allowed to contact with HMPA, NMP, $\epsilon$ CAP and/or 2P for a suitable time, preferably from 3 minutes to 60 hours, more preferably from 5 minutes to 30 hours to form a crystalline complex. Any contacting method may be employed, but preferablly the organic solvent is absorbed in the polymers or the polymers are dissolved in the organic solvent.

Contacting ratio of the polymer and the organic solvent is preferably such that the organic solvent is present at a molar ratio of at least 1 for obtaining homogeneous crystalline complex. On the other hand, use of the organic solvent in a large amount brings about industrial disadvantages in the subsequent operations and hence the amount of the organic solvent is preferably such that may fully satisfy the dissolution or absorption rate, namely, less than about 10 times the weight of the polymer.

There is no special limitation in contacting temperature of the polymer and the solvent, but preferably the treatment is carried out at a temperature from room temperature to 130° C. Thereafter, to remove excess organic solvent which is not contained in the crystalline complex the treatments such as centrifugal removal of solvent, filtration, distillation, concentration, etc. are effective. Since the crystalline complex formed has low melting point, desirably the drying temperature is lower than the melting point, namely, lower than 130° C, preferably lower than 110° C in the case of using HMPA, lower than 100° C in the case of NMP, lower than 150° C, preferably lower than 130° C in the case of ε CAP and lower than 130° C, preferably lower than 110° C in the case of 2P. The lower limit of the drying temperature is preferably higher than the melting point of the solvents (HMPA 7.2° C, NMP −24° C, ε CAP 70° C and 2P 24.6° C).

Thus produced crystalline complex in which 0.3 - 2.5 of solvent per polymer in molar ratio coexists has the following characteristics. For example, poly-m-phenyleneisophthalamide powder having a relative viscosity of 3.2 is immersed in each solvent at solvent-/polymer of 10/1 (weight ratio) at 65° C for 60 hours and after filtration this is dried in vacuum at 60° C for 24 hours to remove the excess solvent which is not contained in the crystal, whereby crystalline complexes are obtained. The complexes obtained from HMPA, NMP, ε CAP and 2P are respectively referred to as HMPA complex, NMP complex, ε CAP complex and 2P complex, hereinafter.

Figure 8:
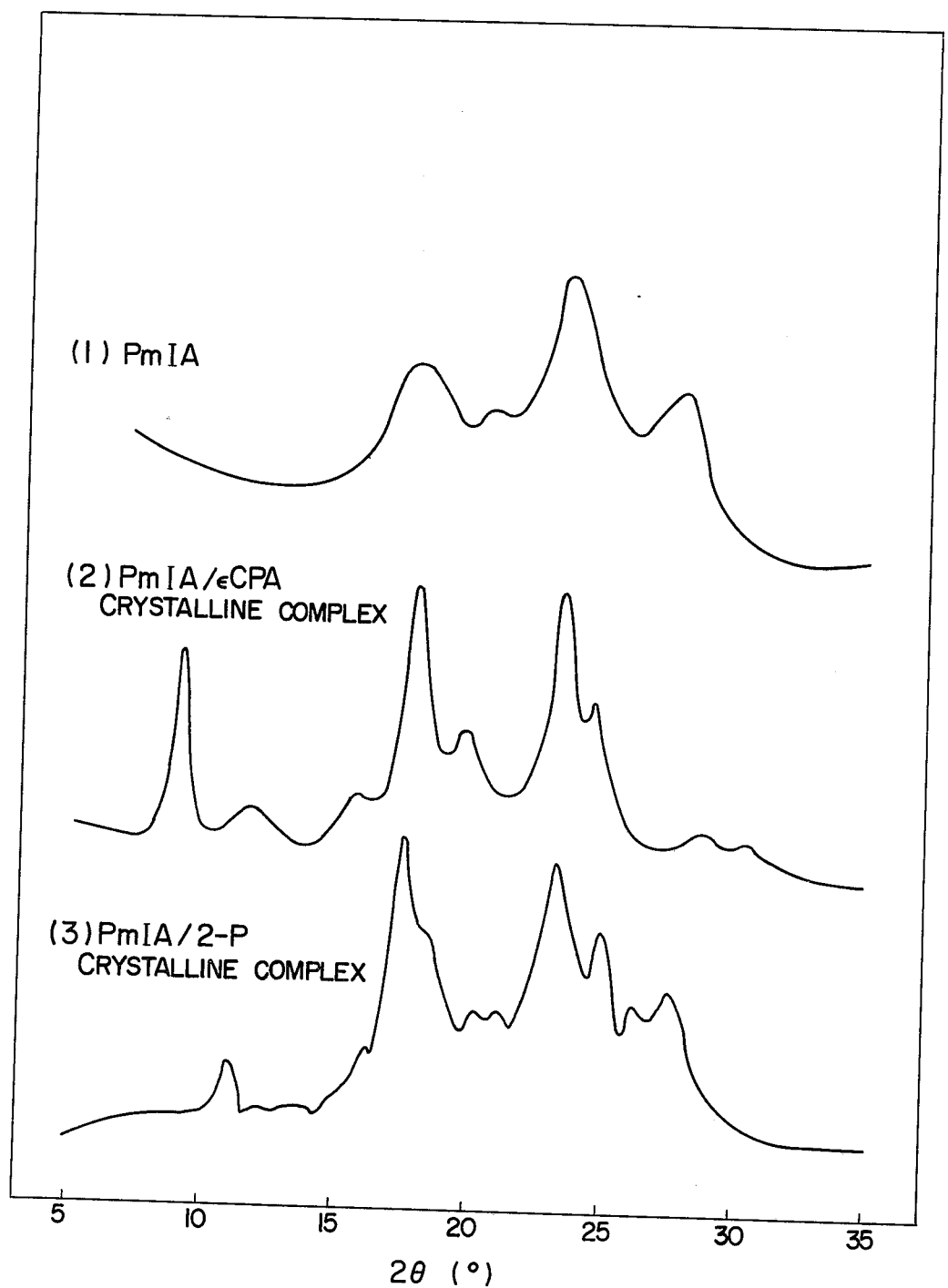
FIG. 8 shows X-ray diffraction patterns of the crystalline complexes of the present invention and poly-m-phenylene isophthalamide.

X-ray diffraction patters of the complexes are as shown in Table 1, FIG. 1(2) and (3) and FIG. 8 (2) and (3). For comparison, diffraction patterns of poly-m-phenyleneisophthalamide are also shown in FIG. 1(1) and FIG. 8(1).

From these results, the crystal structure of the HMPA complex was confirmed that this complex belongs to the monoclinic system and has the following unit cell.

$a = 10.48$ A
$b = 16.94$ A
$c = 11.30$ A
$\beta = 131.3°$

Theoretical density is 1.314 g/cm³ and the observed value measured in decalin at 30° C was 1.24 g/cm³ which varies from 1.20 - 1.29 g/cm³ depending on the production conditions of the complex. Theoretical density of untreated poly-m-phenyleneisophthalamide is 1.47 g/cm³ and measured value is 1.38 g/cm³.

Figure 2:
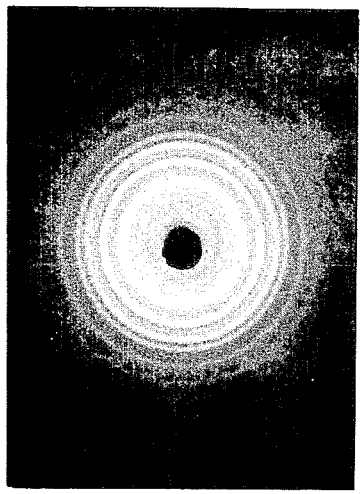
FIG. 2 shows X-ray photographs of powdery and fibrous complexes of the present invention and powdery and fibrous poly-m-phenylene isophthalamide.
Figure 2:
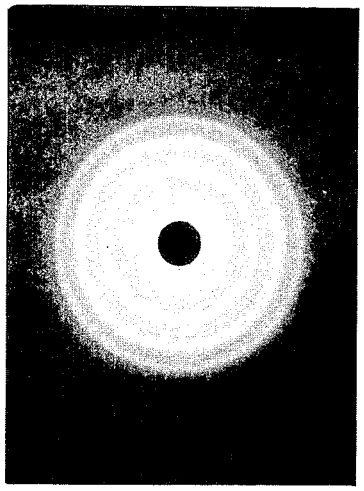
Figure 2:
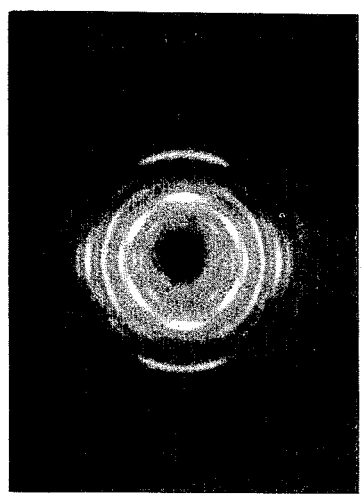
Figure 2:
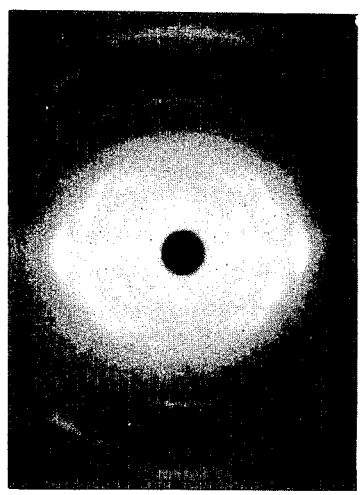

FIG. 2 shows X-ray photographs of (a) PmIA/HMPA crystalline complex powder, (b) poly-m-phenyleneisophthalamide crystalline powder, (c) oriented fibrous PmIA/HMPA crystalline complex, and (d) oriented and crystallized poly-m-phenyleneisophthalamide fibers.

Figure 3:
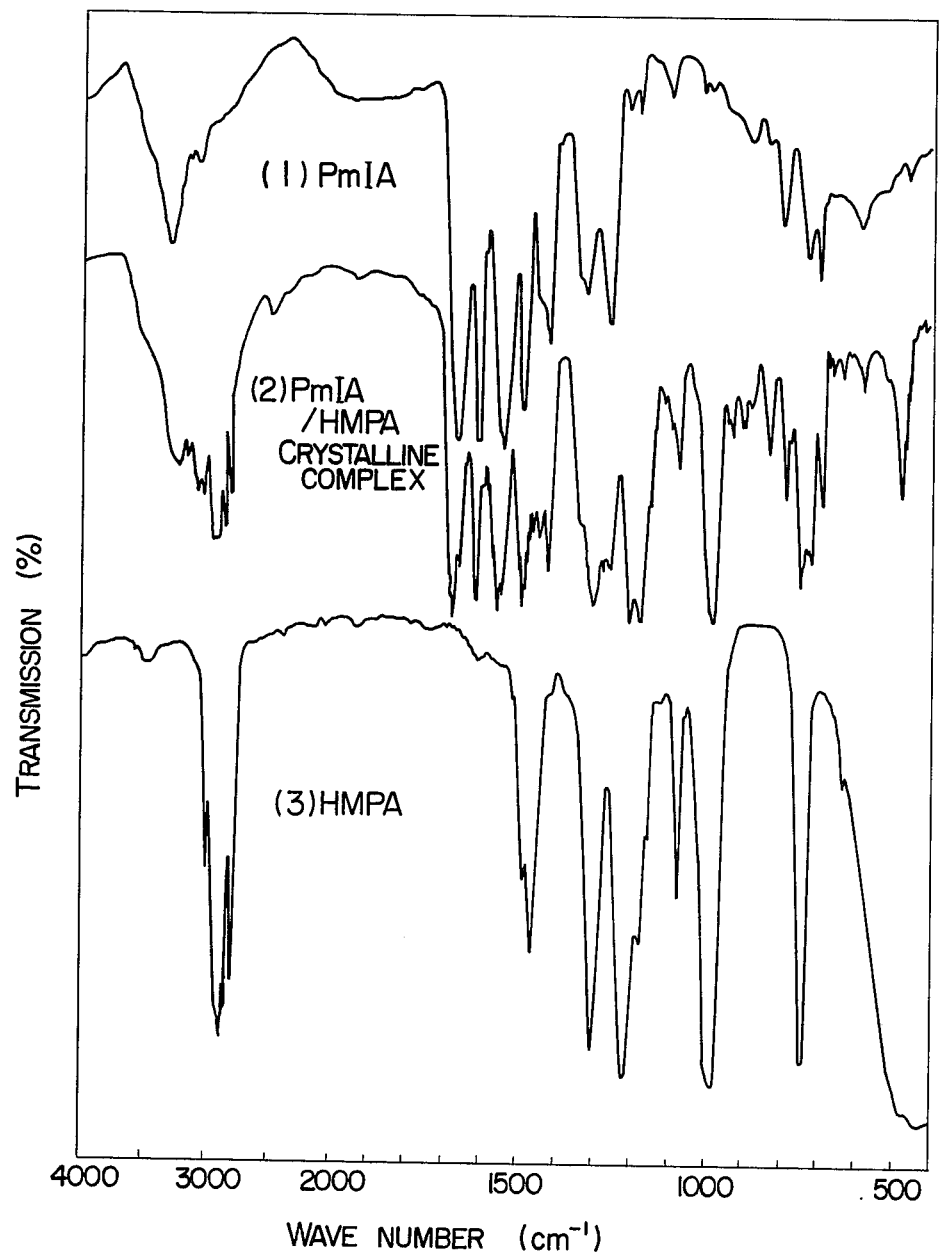
FIG. 3 shows infrared spectra of crystalline complex of the present invention, poly-m-phenylene isophthalamide and hexamethylphosphoric amide.

FIG. 3 shows infrared absorption spectrum of (1) poly-m-phenyleneisophthalamide, (2) PmIA/HMPA complex, and (3) HMPA. N—H stretching vibration of the polymer appears at 3300 cm$^{-1}$ and P=O stretching vibration of HMPA appears at 1220 cm$^{-1}$ while N—H stretching vibration of the PmIA/HMPA complex appears at 3200 cm$^{-1}$ and thus shifts to lower wave number by 100 cm$^{-1}$ and P=O stretching vibration appears at 1200 cm$^{-1}$ and thus shifts to lower wave number by 20 cm$^{-1}$. Therefore, it is considered that PO ⟶ HN bond is formed in the HMPA complex.

Figure 4:
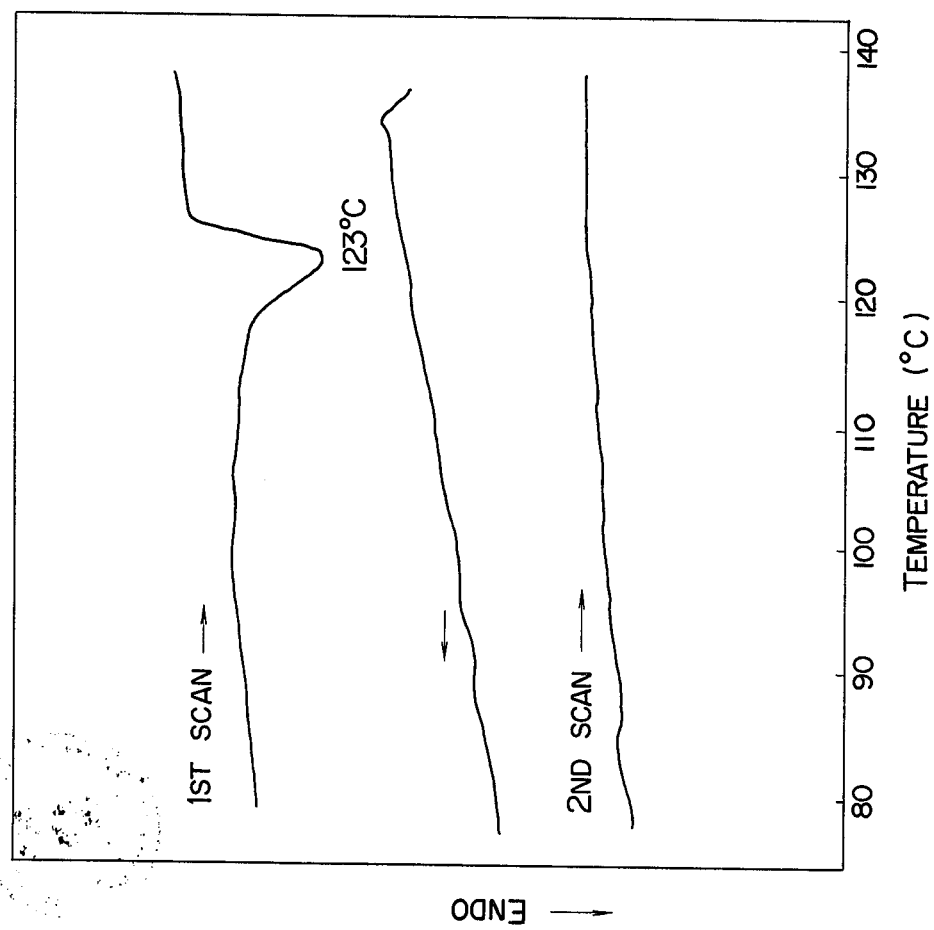
FIG. 4 shows DSC curve of the crystalline complex of the present invention, which is composed of poly(m-phenylene isophthalamide) and hexamethylphosphoric amide.

The melting point was measured by measuring DSC curve at a temperature elevation rate of 10° C/min by a thermal analysis apparatus (DSC II manufactured by Perkin-Elmer Co. Ltd). The results are shown in FIG. 4 in which an endothermic peak is recognized at 123° C. The melting point varies from about 111° - 129° C depending on the degree of polymerization of the polymer and the preparing conditions of the complex. Said melting point is much lower than that of poly-m-phenyleneisophthalamide polymer (420° C) and this fact indicates that the crystalline complex of the present invention is utterly novel.

Figure 5:
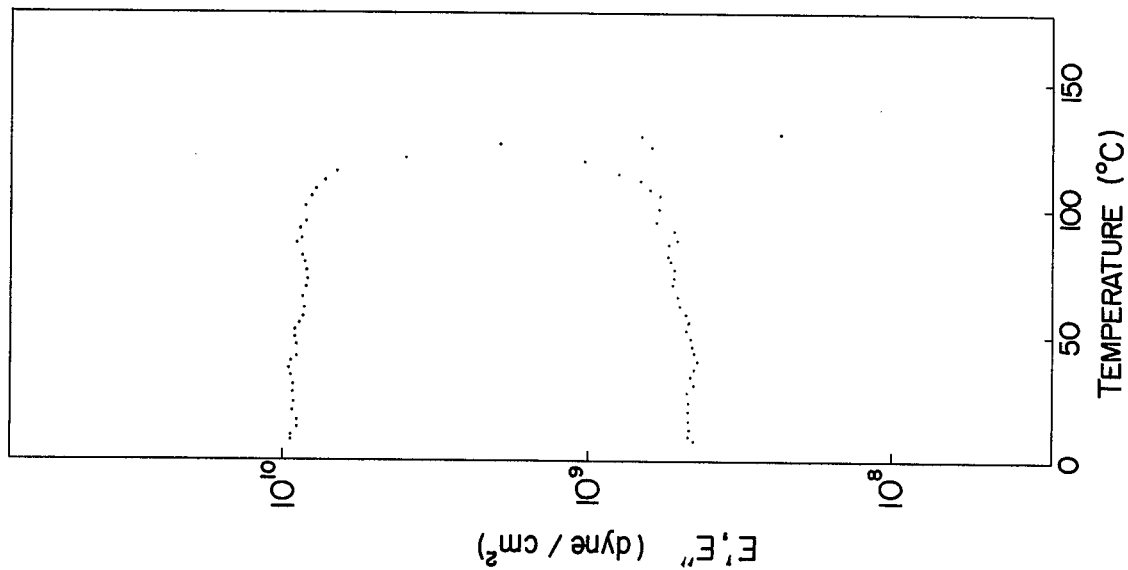
FIG. 5 shows dynamic viscoelastic behavior of the crystalline complex of the present invention, which is composed of poly(m-phenylene isophthalamide) and hexamethylphosphoric amide.

Dynamic viscoelastic behavior of the PmIA/HMPA complex is as shown in FIG. 5. When the temperature exceeds about 110° C, tan δ abruptly increases and correspondingly E' abruptly begins to decrease. When higher than 132° C, measurement becomes impossible and it is considered that at higher than 132° C the complex is fluidized. This phenomenon shows that the crystalline complex of the present invention can be melt spun.

When the solvent was removed from the HMPA complex by boiling water extraction, the molar ratio of Table 1

|  | Poly-m-phenylene-isophthalamide polymer | | Hexamethyl-phosphoric amide complex | | 2-Pyrrolidone complex | | N-methyl-2-pyrrolidone complex | | ε-Caprolactam complex | |
|---|---|---|---|---|---|---|---|---|---|---|
|  | 2 θ(°) | Intensity | 2 θ(°) | Intensity | 2 θ(°) | Intensity | 2 θ(°) | Intensity | 2 θ (°) | Intensity |
|  | 18.0 | m | 10.7 | w | 11.0 | m | 11.5 | w | 9.0 | s |
|  | 20.9 | w | 12.2 | w 17.4 | 13.5 | v.s | w | 11.8 | w |  |
|  | 23.5 | s | 14.0 | v.s | 20.2 | w | 16.2 | v.s | 17.9 | v.s |
|  | 28.0 | m | 15.1 | m | 21.1 | w | 18.3 | w | 19.8 | m |
|  |  |  | 19.1 | s | 23.3 | v.s | 22.0 | w | 23.3 | v.s |
| X-ray diffraction |  |  | 22.2 | m | 25.0 | s | 24.4 | v.s | 24.5 | m |
|  |  |  | 24.5 | m | 26.2 | m | 26.0 | s | 28.7 | v.w |
|  |  |  | 26.5 | v.w | 27.5 | m |  |  |  |  |
|  |  |  | 27.9 | w |  |  |  |  |  |  |
|  |  |  | 31.1 | w |  |  |  |  |  |  |
| Melting | 420° C | | 120° C | | 130° C | | 100° C | | 150° C | | w: weak
m: middle
s: strong
v: very poly-m-phenyleneisophthalamide and HMPA was 1 : 1.88 (= 1 : 1.42 in weight ratio). This value also varies depending on the conditions for production of the complex and the complexes having 0.4 - 1.88 in molar ratio of the polymer and the solvent are obtained.

Figure 6:
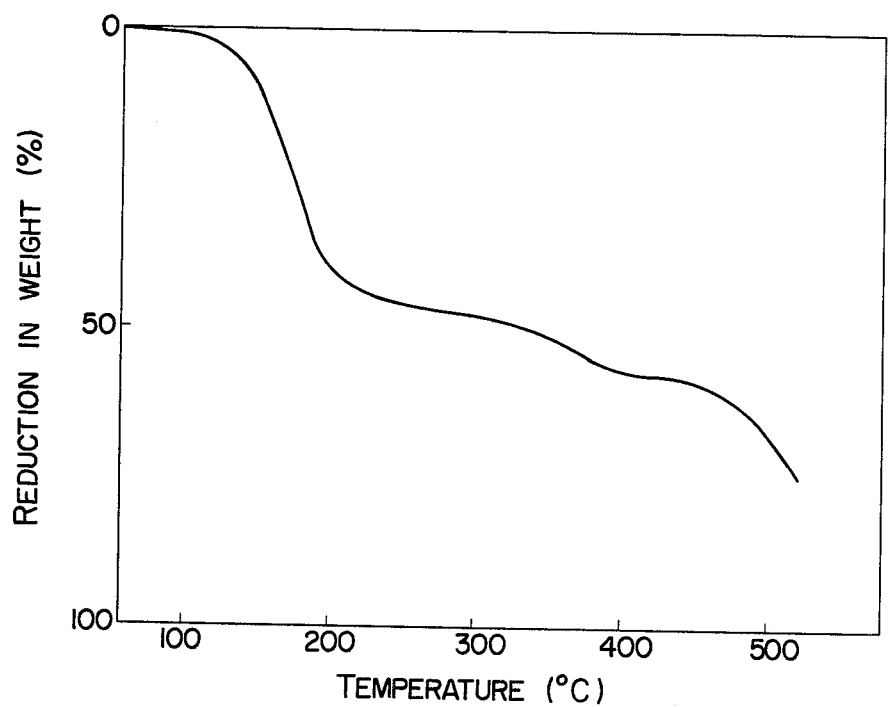
FIG. 6 shows the result of thermogravimetric analysis of the crystalline complex of the present invention, which is composed of poly(m-phenylene isophthalamide) and hexamethylphosphoric amide.

FIG. 6 shows the results of thermogravimetric analysis. The TGA curve was prepared at a heating rate of 2.5° C/min in air. 230° C is the boiling point of HMPA and it is considered that reduction in weight at higher than 400° C is due to decomposition of the polymer. Therefore, about 55% by weight of HMPA is contained in the complex and this result well corresponds to the value measured by said boiling water extraction.

Figure 7:
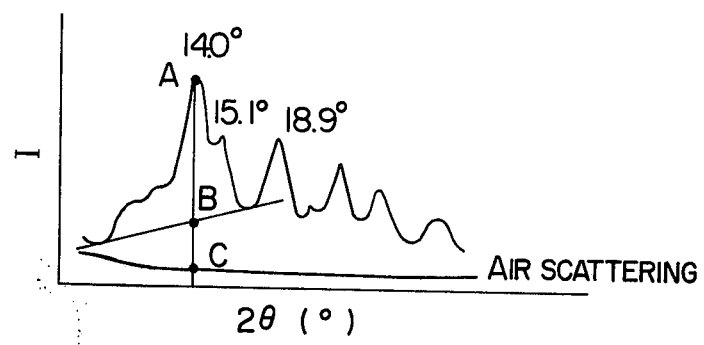
FIG. 7 shows the X-ray diffraction pattern for calculating crystallinity index of the crystalline complex of the present invention, which is composed of poly(m-phenylene isophthalamide) and hexamethylphosphoric amide.

Crystallinity index of the PmIA/HMPA complex was calculated from X-ray diffraction patterns (as shown in FIG. 7) as follows:

$$\text{Index} = I_c/I_t = \overline{AB}/\overline{AC} = 0.77$$

This value varies from 0.63 to 0.77 depending on the conditions for production of the complex.

Size of crystal was calculated in the following equation using the broadness of reflection on the meridian.

$$D = k\lambda/\beta \cos \theta$$

$\lambda$: 1.5418 A
$k$: 0.89
$\theta$: $2\theta = 15.1$
$\beta$: half width after silicon correction Thus, the size of crystal is 69 A. This value also varies from 66 - 72 A depending on the conditions for production of the complex.

From the above results, the PmIA/HMPA complex obtained in the present invention is considered to have a chemical structural formula having the following repeating unit.

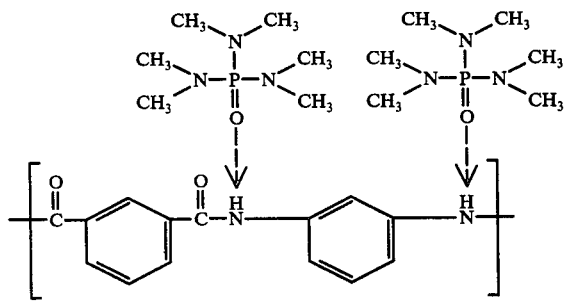

The crystalline complex of the present invention is suitable as starting materials for fibers, films, non-woven fabrics, filter media, binders, etc. due to their characteristic of low melting point. Especially, the crystalline complex obtained using aromatic polyamide in the form of oriented fibers is useful because of its excellent property as a binder for non-woven fabrics. The crystalline complex of the present invention makes it possible to provide said articles in much lower cost as compared with the conventional method of using the poly-m-phenyleneisophthalamide itself.

For example, in order to produce sheet-like materials from heat resistant fibers using the crystalline complex as a binder; when fibrous crystalline complex is used, the two fibers are mixed by a carding machine to form a web and then this web is hot pressed by calender roll and when powdery crystalline complex is used, the powder is uniformly added to a sheet-like material which has been previously produced by the known method and then this sheet-like material is hot pressed by calender roll. The amount of the crystalline complex added may vary depending on the use and property of the desired articles, but is preferably 1.0 - 10% by weight in case thin articles are desired, 10 - 50% by weight in case thick articles are desired and at least 50% by weight in case paper-like articles are desired.

The hot pressing of the web is carried out preferably at higher than the melting point of the crystalline complex. The upper limit of the temperature may be substantially the glass transition temperature (300° - 330° C) of the constituent fibers, but from the industrial viewpoint the temperature of higher than 300° C is economically not preferred and a temperature of lower than 250° C is preferred.

Thus hot pressed non-woven fabric has sufficient strength and uniform appearance and is excellent in dimensional stability. This fabric contains a slight amount of the solvent. Removal of the solvent can be easily accomplished by passing the fabric through cold water, warm water or steam. Thereafter, the fabric is subjected to drying step. In this drying step the complex compound has already been converted into poly-m-phenyleneisophthalamide and so the fabric is in strong and highly heat resistant.

The present invention referred to above provides great industrial effects as follows: since the special crystalline complex of low melting point can be used as the adhesion component, non-woven fabric or paper-like material can be easily formed at a low hot pressing temperature; since said complex is crystalline and has a clear melting point, the hot pressing temperature can be kept constant and quality control and handling are extremely easy and moreover, since after hot pressing step the non-woven fabric or paper-like material is subjected to the solvent removing treatment to convert said crystalline complex into poly-m-phenyleneisophthalamide excellent in heat resistance, non-woven fabric or paper-like material having much higher heat resistance than that of the conventional articles can be obtained.

Furthermore, the method for extruding the crystalline complex of the present invention into fibers or films is, for example, as follows: As mentioned above, the present complex is powder or pellet at room temperature and is molten and softened at higher temperature than melting point. At higher than the melting temperature, the complex has a melt viscosity of $10^3 - 10^6$ poises which may vary depending on polymerization degree of the polymer and amount of the coexisting solvent and so it can be extrusion molded. The amount of the coexisting solvent in this case is preferably 0.5 - 2.5 per the polymer in molar ratio. When the amount of the solvent exceeds said ratio, plasticizing effect becomes remarkable and this extrusion condition is the same as gel extrusion. The structural formation of undrawn product is close to that of usual wet or dry extrusion and in the case of fibers, the strength of undrawn fibers is less than 1 g/d and spinning velocity is less than several ten m/min.

The complex is then extruded from a nozzle, T-die and the like at a temperature higher than the melting temperature by at least 5° C, preferably at least 10° C. Thus extruded product is treated by subjecting it to washing, drawing, drying or hot drawing with or without winding up before these treatments. The washing and drawing may be simultaneously conducted or in converse sequence.

For example, in the case of fiber making, spinning can be carried out at a high spinning velocity (higher than 100 m/min) and undrawn filaments already show high orientation. Then, the filaments are drawn to 1 - 5 times in warm water of about 100° C. The filaments are dried in hot air or on hot roll or plate and thereafter are drawn to not more than 4 times by passing through hot rollers or hot plates of at least 300° C, preferably 330° C. The filaments after subjected to hot drawing of 3 times have a strength of 7.5 g/d, are highly oriented and have high crystallinity, compared with those obtained by usual wet or dry process.

The present invention requres no coagulation bath and does not positively requires the use of metal salts commonly used in preparing the dope of aromatic polyamide. Therefore, cost for recovery of metal salts from spinning bath and washing bath is not necessary and amount of the organic solvent used is small. Thus, the method of the present invention is economically very advantageous.

The aromatic polyamide used in the present invention are those in which at least 75 mol % of repeating unit comprises m-phenyleneisophthalamide obtained by solution polymerization or interfacial polymerization of m-phenylenediamine and isophthalic acid halide such as isophthalic acid chloride.

When the copolymerization component exceeds 25 mol %, the crystallinity of crystalline complex markedly decreases and then this is not preferred in this invention. Amine component of the copolymerization component includes p-phenylenediamine, benzidine, 4,4'-diaminodiphenyl ether, 4,4'-diaminodiphenyl sulfone, etc. and acid component includes dicarboxylic acid halides such as terephthalic acid chloride, 1,4-naphthalene dicarboxylic acid chloride, 2,6-naphthalene dicarboxylic acid chloride, diphenylsulfone 4,4'-dicarboxylic acid chloride, diphenylether 4,4'-dicarboxylic acid chloride, etc.

When metal ions such as calcium, lithium, aluminum, etc. contained in the polymer exceed several thousands ppm, complexes of other structure are formed and the metal ions are desirably contained in an amount of less than 2,000 ppm.

The following examples, illustrating the present invention, are given without any intention that the invention be limited thereto.

EXAMPLE 1

Powder of poly-m-phenyleneisophthalamide having a relative viscosity of 3.5 was immersed in hexamethylphosphoric amide (HMPA) at a ratio of HMPA/polymer = 3/1 (weight ratio) at 50° C for 2 hours. After the polymer was filtered off, this was dried at 2 mmHg at 60° C for 5 hours. X-ray diffraction pattern thereof shows strong and sharp reflections at $2\theta$ = 14.0°, 15.1°, 19.1° and 22.2°. These are different from reflections of poly-m-phenyleneisophthalamide.

Reduction in weight by the extraction of boiling water was 56 weight % (corresponding to HMPA/polymer = 1.69/1 molar ratio), which is the amount of HMPA contained in the sample. In spite of such large amount of solvent being contained, the sample had dry touch and was easy in handling. The melting point of this sample from DSC curve was 116° C.

EXAMPLE 2

The same polymer powder as used in Example 1 was dissolved in dimethylacetamide and the solution was dry spun by the usual method, washed in boiling water and dried to obtain undrawn fibers. These undrawn fibers had a strength of 0.8 g/d, an elongation of 230% and a density of 1.345 g/cm$^3$. They were drawn to 3.6 times in hot water of 80° C and heat treated on a hot plate under drawing of 1.0 time under the conditions as shown in Table 2. Then, the above fibers were immersed in HMPA at a ratio HMPA/polymer = 3/1 (weight ratio) and thereafter the treated fibers were filtered off. Then, the fibers were subjected to centrifugal removal of solvent at 80° C for 2 hours and dried. These samples maintained fibrous form and showed reflection peculiar to crystalline complex in X-ray diffraction pattern and these reflections were the same as that of example 1. Properties of the samples are shown in Table 2.

Table 2

| Heat treating temperature | HMPA treating conditions | | | Properties | | | |
|---|---|---|---|---|---|---|---|
| | | | | Degree of complex formation | Melting point | Strength | Elongation |
| Undrawn fibers | 50° C | × | 3 hours | complete | 121° C | 0.5 $^{g/d}$ | 5 % |
| 250° C | 80 | × | " | " | 121 | 3.0 | 30.5 |
| 270 | 80 | × | " | " | 123 | 3.0 | 30.3 |
| 290 | 100 | × | " | " | 120 | 3.1 | 34.0 |
| 300 | 140 | × | " | " | 122 | 3.1 | 38.5 |

The fibers of complex made from the undrawn fibers were fragile and could be easily powdered.

The fibers of complex obtained from the heat treated fibers showed orientation of crystal of complex, too. (FIG. 2, c)

EXAMPLE 3

A film obtained from poly-m-phenyleneisophthalamide having a relative viscosity of 3.2 by the usual method was drawn to 4 times in boiling water. Thus obtained oriented film was immersed in HMPA at HMPA/polymer = 10/1 (weight ratio) at 65° C for 60 hours and then was dried at 3 mmHg at 60° C for 24 hours. The X-ray diffraction photograph of the above sample was taken by using of a cylindrical camera of 35 mm in radius, rotating the sample. Many reflections other than shown in Table 1 were observed on the cylindrical photograph. From this photograph it was confirmed that the reflection at $2\theta$ = 14° was that on the first layer line, the reflection at $2\theta$ = 15.1° was that on the meridian on the second layer line and the reflection at $2\theta$ = 26.5° was that on the third layer line respectively. The melting point was 125° C from DSC curve and the comparison of this crystalline complex calculated from the extraction by boiling water was HMPA/polymer = 1.76/1 in molar ratio. Density was 1.20 g/cm$^3$, size of crystal = 67 A and $It/Ic = AB/AC$ = 0.67.

EXAMPLE 4

An oligomer having chain ends of COOH and an average degree of polymerization of 5 was immersed in HMPA at HMPA/polymer = 10/1 (weight ratio) at 65° C for 10 hours and, the product was dried under 2 mmHg at 60° C for 24 hours after filtering off. X-ray diffraction pattern of the product was the same as that of Example 1 and the melting point from DSC curve was 111° C. Extraction by boiling water showed molar ratio of HMPA/polymer = 1.88/1 and the density was 1.22 g/cm³.

EXAMPLE 5

A polymer powder which was obtained by solution polymerization of m-phenylenediamine and isophthalic acid chloride/terephthalic acid chloride 90/10 (molar ratio) at low temperature and which had a relative viscosity of 3.5 was dissolved in HMPA at HMPA/polymer =5/1 (weight ratio) at 60° C and then the solution was dried at 2 mmHg at 40° C for 12 hours to obtain dry touch powder.

It was confirmed from X-ray diffraction pattern that complex crystal was formed.

Reduction in weight of said powder due to boiling water extraction was 50.5 weight % and the melting point measured from DSC curve was 115° C. The viscous material molten at 130° C showed excellent moldability.

EXAMPLE 6

A polymer powder obtained by precipitating in water at lower than 40° C from a solution of dimethylacetoamide and poly-m-phenyleneisophthalamide having a relative viscosity of 3.5 and drying the precipitate of polymer at lower than 80° C was dispersed in HMPA which was in an amount of 10 times that of the polymer in weight ratio, and the dispersion was dissolved with stirring and heating to 100° C. The resultant solution was cooled to 25° C to obtain a gel-like product, which had an X-ray diffraction pattern of complex crystal. This gel-like product was again heated to 80° C and dried at 1 mmHg for 24 hours. The molar ratio solvent/polymer of this dried product was 1.3 and the melting point was 126° C.

The product was extruded through a nozzle having 10 holes (each hole was circular and had a diameter of 0.5 mm) under 65 kg/cm² at 150° C. L/D of the nozzle was 5. The extruded fibers were taken up at a velocity of 200 m/min. The undrawn fibers were fed into a washing bath of 3 m length at 20 m/min and drawn to 1.5 time by a take-up roll of 30 m/min while washing at 100° C. Then, they were passed through a drying roller at 150° C and drawn to 2 times on a hot plate of 320° C. The fibers thus drawn by totally 3 times had good appearance and luster and properties of the fibers were as follows:
  Denier: 2.0 d
  Strength: 6.0 g/d
  Elongation: 28%
  Initial modulus: 120 g/d

EXAMPLE 7

Poly-m-phenyleneisophthalamide having a relative viscosity of 3.2 was dry spun and then the resultant fibers were drawn to 4.0 times in boiling water. Furthermore, they were additionally drawn to 1.1 time to obtain drawn fibers (size 2d, strength 5.0 g/d and elongation 28%). These fibers were cut to 51 mm and a web was formed in carding process.

Separately, said poly-m-phenyleneisophthalamide powder was immersed in HMPA at HMPA/polymer = 2 (weight ratio) at 50° C for one hour. Thereafter, the product was filtered off and dried in vacuum at 80° C for 5 hours to obtain powder of crystalline complex of said poly-m-phenyleneisophthalamide and HMPA, which had a melting point of 120° C measured from DSC curve and an average particle size of 0.2 mm.

Thus obtained powder of crystalline complex was uniformly added on the said web and this was subjected to calender treatment at 100 kg/cm and 140° C, then treated with steam of 1 kg/cm³G for 3 minutes and thereafter dried. Thus obtained non-woven fabric which had the properties as shown in Table 3 had smoothness and self extinguishing property and its strength and elongation did not change even after treatment at 250° C for 5 hours.

Table 3

| Weight of complex compound (%) | Basis weight (g/m²) | Tensile strength (kg/50 mm) | Elongation (%) |
|---|---|---|---|
| 5 | 27 | 5.0 | 20 |
| 10 | 30 | 7.2 | 16 |
| 30 | 33 | 10.1 | 10 |
| 50 | 37 | 20.3 | 7 |

EXAMPLE 8

The same polymer as used in Example 7 was dry spun. Undrawn fibers (sample A) washed in boiling water and drawn fibers (sample B) drawn to 4.0 times in boiling water were prepared from dry spun fibers. Each of sample A and sample B was immersed in 100% by weight of hexamethylphosphoric amide at 50° C for one hour, then filtered off and dried in vacuum at 80° C for 5 hours to obtain fibrous complex. Separately sample B was immersed in HMPA at HMPA/polymer = 1/1 (weight ratio) at 30° C for 20 minutes, filtered off and dried in vacuum at 80° C for 5 hours to obtain partially complexed fibers. In the X-ray diffraction pattern of said fibers, there existed both crystalline complex and poly-m-phenyleneisophthalamide crystal.

20% of each of thus obtained three fibrous complexes were uniformly mixed with the same untreated short fibers as used in Example 7 and these were subjected to carding to obtain three webs. These three webs were subjected to calendering streatment at 100 kg/cm and 140° C, then treated with steam of 1 kg/cm²G for 3 minutes and thereafter dried. Properties of the resultant non-woven fabrics are shown in Table 4. Strength and elongation of these fabrics did not change even after treatment at 250° C for 5 hours and they had self extinguishing property.

Table 4

| Fibrous crystalline complex | Basis weight (g/m²) | Tensile strength (kg/50 mm) | Elongation (%) |
|---|---|---|---|
| Partial complex of drawn fibers | 35 | 12.3 | 13 |
| Complete complex of drawn fibers | 35 | 11.5 | 11 |
| Complex of undrawn fibers | 35 | 10.5 | 10 |

EXAMPLE 9

Powder of poly-m-phenyleneisophthalamide having a relative viscosity of 3.2 was immersed in HMPA at HMPA/polymer = 10/1 (weight ratio) at 65° C for 60 hours. Then the polymer was filtered off and then the solvent was removed. Thereafter, the product was vacuum dried at 60° C for 24 hours to obtain crystalline complex powder having a melting point of 122° C (100% of the powder passed through 100 meshes and 95% passed through 150 meshes). This crystalline complex powder was mixed with poly-m-phenyleneisophthalamide powder (100% of the powder passed through 100 meshes and 95% passed 150 meshes) at a weight ratio of 1 : 1. The mixture was placed in a metal mold of 100 mm × 100 mm previously heated to 150° C, pressed under a pressure of 20 kg/cm$^2$, maintained at 150° C for 3 minutes and then allowed to stand for cooling under pressure. The resultant molded product had a thickness of 1.0 mm. This was put in warm water of 80° C and allowed to stand for 30 minutes and then dried by a drier kept at 150° C. Thus obtained molded plate had a vacant volume of 73% and a filter plate of 5 cm in diameter produced from said molded plate required 8 seconds for filtering 100 cc of distilled water under 740 mmHg. The plate had a strength of 4.0 kg/cm$^2$ measured by Mullen type bursting strength tester.

The plate showed no change in properties even after kept at 200° C for 200 hours in air.

EXAMPLE 10

Poly-m-phenyleneisophthalamide powder having a relative viscosity of 3.5 was immersed in N-methylpyrrolidone (NMP) at NMP/polymer = 10/1 (weight ratio) at 50° C for 3 hours, then filtered off and vacuum dried at 40° C for 5 hours under 2 mmHg.

Peculiar sharp reflections were observed at 2 $\theta$ = 16.2°, 24.5° and 26.2° in X-ray diffraction pattern of said product [FIG. 1(3)]. These reflections were different from those of poly-m-phenyleneisophthalamide crystal and this fact shows that complex crystal was formed.

Said sample had dry touch and a melting point of 90° C measured from DSC curve and showed reduction in weight of 45 weight % by boiling water extraction (corresponding to NMP/polymer = 2/1 molar ratio).

EXAMPLE 11

Poly-m-phenyleneisophthalamide having a polymerization degree of 5 and having chain end of benzene ring was immersed in NMP at NMP/polymer = 3/1 (weight ratio) at 30° C for 3 hours and then this was vacuum dried at 2 mmHg at 40° C for 5 hours. Thus obtained crystalline complex had a melting point of 65° C.

EXAMPLE 12

Powder of the same polymer as in Example 10 was immersed in NMP at NMP/polymer = 5/1 (weight ratio) at 30° C for 5 hours, filtered off and dried in vacuum at 50° C for 5 hours to obtain powder of poly-m-phenyleneisophthalamide and NMP complex. According to X-ray diffraction, said complex powder was crystalline material clearly different from poly-m-phenyleneisophthalamide crystal and had a melting point of 90° C. 20% of said complex powder was uniformly scattered on a web produced from drawn fibers (size 2d, strength 5.0 g/d and elongation 28%) which were produced by dry spinning poly-m-phenyleneisophthalamide having a relative viscosity of 3.2, then drawing to 4.0 times in boiling water and additionally drawing to 1.1 time at 340° C and which were cut to 51 mm. Then, thus treated web was calendered at 100° C and 100 kg/cm, thereafter treated with steam of 1 kg/cm$^2$G for 3 minutes and then dried. Thus obtained non-woven fabric had a tensile strength of 4.8 kg/50 mm and an elongation of 15% and had self extinguishing property. Strength and elongation did not change even after treatment at 250° C for 5 hours.

EXAMPLE 13

Poly-m-phenyleneisophthalamide powder having a relative viscosity of 3.5 was dissolved in NMP in an amount of 10 times that of the polymer at 30° C. This solution was dried at 40° C for 24 hours under 1 mmHg.

The molar ratio NMP/polymer of thus obtained dried product was 1.5 and X-ray diffraction pattern thereof was that of the crystalline complex of poly-m-phenyleneisophthalamide and NMP. Melting point of the product was 103° C.

Said dried product was extruded from a nozzle having ten holes (each hole was circular and had a diameter of 0.5 mm) at 130° C. L/D of the nozzle was 5. The spinning pressure was 65 kg/cm$^2$. The spun fibers were taken up at 200 m/min. The undrawn fibers were fed into a washing bath of 3 m in length at 20 m/min and drawn to 1.5 time by take-up roll of 30 m/min with washing at 100° C. Then, the fibers were passed through drying roller at 150° C and drawn to 3 times on a hot plate of 320° C. Thus, a drawn ratio of totally 4.5 times was given. Thus obtained fibers had good appearance and luster and the fibers had the following properties.

Denier: 2.2 d
Strength: 6.5 g/d
Elongation: 30%
Initial modulus: 110 g/d

EXAMPLE 14

The same NMP complex powder as used in Example 13 was extruded from T-die at 130° C. Thus extruded sheet was allowed to contact with a metallic roller having a surface temperature of 20° C and then drawn to 4 times between the roller in an atmosphere of 150° C. The drawn sheet was retained in water of 100° C for 10 seconds, then dried at 150° C and thereafter heat treated on a hot plate of 320° C. Thus obtained sheet was transparent and had a thickness of 30 $\mu$. Physical properties of the sheet were as follows:

|  | Machine direction | Width direction |
| --- | --- | --- |
| Strength (kg/mm$^2$) | 20 | 8 |
| Elongation (%) | 35 | 200 |
| Initial modulus (kg/mm$^2$) | 300 | 180 |

EXAMPLE 15

Poly-m-phenyleneisophthalamide powder having a relative viscosity of 3.4 was immersed in 2-pyrrolidone (2P) at 2P/polymer = 10/1 (weight ratio) at 50° C for 2 hours, filtered off and dried at 60° C for 5 hours under 2 mmHg. In X-ray diffraction pattern [FIG. 8(3)] of the product, sharp reflections were observed at 2 $\theta$ = 11.0° (m), 17.4° (v.s), 18.4° (w), 20.2° (w), 21.0° (w), 23.2° (s), 25.0° (s), 26.2° (m) and 27.4° (m). These were different from those of poly-m-phenyleneisophthalamide crystal.

The amount of boiling water extraction of the crystalline complex was 37 weight % and melting point thereof was 130° C.

The crystalline complex was extruded from a nozzle having ten holes at 150° C and under a spinning pressure of 65 kg/cm².

The spun fibers were taken up at 200 m/min. The undrawn fibers were fed into a washing bath of 3 m in length at 20 m/min and drawn to 1.5 time by a take-up roll of 30 m/min at 100° C while washing. Then, they were passed through a drying roller of 150° C and drawn to 2 times on a hot plate of 320° C. The resultant fibers had good appearance and luster and the fibers had a size of 2d, a strength of 4.0 g/d, an elongation of 35% and an initial modulus of 110 g/d.

An oligomer having an average polymerization degree of 5 and chain ends of COOH was treated under the same condition as above. Thus obtained crystalline complex had a melting point of 112° C.

EXAMPLE 16

Poly-m-phenyleneisophthalamide powder having a relative viscosity of 3.5 and ε-caprolactam (ε CAP) powder were mixed at a molar ratio of 1 : 10 and then the temperature was elevated to 150° C to dissolve the mixture. Then, this was dried at 110° C, 120° C and 130° C under 2 mmHg. In the X-ray diffraction pattern [FIG. 8(2)], clear reflections were observed at $2\theta = 9.0°$ (s), 11.8° (w), 17.9° (v.s), 19.8° (m), 23.3° (v.s), 24.5° (m) and 28.7° (v.w).

These crystalline complexes had dry touch and were easy in handling.

The molar ratio ε CAP/polymer obtained from reduction in weight of these crystalline complexes by methanol extraction and melting point obtained from DSC curve are shown in the following Table 5.

Table 5

| No. | Conditions for forming complex | Molar ratio εCAP/polymer | Melting point |
| --- | --- | --- | --- |
| 1 | 110° C | 0.67/1 | 152° C |
| 2 | 120° C | 0.51/1 | 156° C |
| 3 | 130° C | 3.3/1 | 140° C |

The complex of No. 2 was extruded from a nozzle having ten holes at 175° C and under spinning pressure of 65 kg/cm² and thus spun fibers were taken up at 200 m/min. The undrawn fibers were fed into a washing bath of 3 m in length at 20 m/min and drawn to 1.5 time by take-up roll of 30 m/min while washing at 100° C. Then, they were passed through drying roller of 170° C and on a hot plate of 350° C to carry out the drawing of totally 3 times. Thus obtained fibers of 2 d had a strength of 4.5 g/d, an elongation of 30% and an initial modulus of 100 g/d.

EXAMPLE 17

The same polymer powder as in Example 16 was dissolved in dimethylacetamide and the solution was dry spun by the usual method. The resultant fibers were washed in boiling water and dried to obtain undrawn fibers, which had a strength of 0.8 g/d, an elongation of 230% and a density of 1.345 g/cm³. Said undrawn fibers were drawn to 3.6 times in hot water of 80° C and then dry heat treated on a hot plate of 250° C to 1.0 time.

Thus heat treated fibers were added in the solvents shown in Table 6 and kept at 50° C for 6 hours. Thereafter, the fibers were filtered off and dried at 2 mmHg at 120° C to form crystalline complexes.

These crystalline complexes showed the similar X-ray diffraction patter to that of Example 16.

Characteristics of these crystalline complexes are shown in Table 6.

Table 6

| | Samples | | Treating conditions (weight ratio) | Methanol extraction amount after drying (weight %) | Melting point (° C) |
| --- | --- | --- | --- | --- | --- |
| 1 | Undrawn fibers | ε CAP* | 50/50 | 48 | 153 |
| 2 | 250° C Dried fibers | methanol : ε CAP/fibers | 50 : 50/50 | 42 | 148 |
| 3 | " | water : ε CAP/fibers | 50 : 50/20 | 45 | 150 |
| 4 | " | benzene : ε CAP/fibers | 50 : 50/20 | 47 | 152 |
| 5 | " | dimethylformamide : ε CAP/fibers | 50 : 50/20 | 48 | 153 |

*ε CAP: ε-caprolactam

EXAMPLE 18

Heat treated fibers under tension obtained by the same method as in Example 16 were cut into 51 mm. These cut fibers were dispersed in ε CAP/benzene (1/1 in weight ratio) mixed liquid which was 5 times the weight of the cut fibers. This dispersed solution was maintained at 50° C for 6 hours, and then filtered off and dried at 120° C under 2 mmHg to obtain crystalline complex. Said fibrous crystalline complex showed the same X-ray diffraction pattern as in Example 16 and had a melting point of 150° C.

Poly-m-phenyleneisophthalamide having a relative viscosity of 3.2 was dry spun. The resultant fibers were drawn to 4.0 times in boiling water and additionally drawn to 1.1 time at 340° C to obtain drawn fibers (size 2 d, strength 5 g/d and elongation 28%). These fibers were cut to 51 mm and uniformly mixed with 20 weight % of said fibrous complex to form a web.

Said web was subjected to calendering treatment at 170° C and 100 kg/cm, and then treated with 1 kg/cm²G of steam for 3 minutes and then dried.

Thus obtained non-woven fabric had a tensile strength of 4.5 kg/50 mm and an elongation of 13% and showed self extinguishing property. The strength and elongation did not change even after treatment at 250° C for 5 hours.

EXAMPLE 19

The same polymer powder as used in Example 16 was dissolved in the solvents shown in Table 7 at 50° C and then the solutions were dried at 45° C for 6 hours under 2 mmHg. Thus obtained samples exhibited dry touch. These samples obtained from mixed solvents were crystalline and in X-ray diffraction pattern thereof, two kinds of reflections of crystalline complexes composed of the polymer and single solvent were observed. Furthermore, also two kinds of melting points were observed as shown in Table 7.

Table 7

| | HMPA/εCAP | HMPA/NMP | HMPA/2P | εCAP/NMP | εCAP/2P | 2P/NMP |
|---|---|---|---|---|---|---|
| Ratio of solvents/Polymer (weight ratio) | 50/50/20 | 15/85/20 | 15/85/20 | 10/90/20 | 10/90/20 | 10/90/20 |
| Melting point | 123° C (147° C) | 95° C (119° C) | 120° C (128° C | 97° C (150° C) | 130° C (149° C) | 99° C (128° C |

What is claimed is:

1. A crystalline complex which consists essentially of an aromatic polyamide and from 0.3 to 2.5 moles of at least one member selected from the group consisting of hexamethylphosphoric amide, N-methyl-2-pyrrolidone, ε-caprolactam and 2-pyrrolidone per mole of said aromatic polyamide, at least 75 mol % of repeating unit of said aromatic polyamide being m-phenyleneisophthalamide, wherein said crystalline complex has a maximum melting point of 156° C.

2. The crystalline complex of claim 1 which consists essentially of an aromatic polyamide and hexamethylphosporic amide and which shown reflections at X-ray diffraction angle (2θ) of 10.7°, 12.2°, 14.0°, 15.1°, 19.1°, 22.2°, 24.5°, 26.5°, 27.9° and 31.1°.

3. The crystalline complex of claim 1, which is produced by contacting an aromatic polyamide with hexamethylphosphoric amide to form a crystalline complex and then removing the excess of hexamethylphosphoric amide which is not contained in the crystal and which shows reflections at X-ray diffraction angles (2θ) of 10.7°, 12.2°, 14.0°, 15.1°, 19.1°, 22.2°, 24.5°, 26.5°, 27.9° and 31.1°.

4. The crystalline complex of claim 1 which consists essentially of an aromatic polyamide and N-methyl-2-pyrrolidone and which shows reflections at X-ray diffraction angles (2θ) of 11.5°, 13.5°, 16.2°, 18.3°, 22.0°, 24.4° and 26.0°.

5. The crystalline complex of claim 1, which is produced by contacting an aromatic polyamide with N-methyl-2-pyrrolidone to form a crystalline complex and then removing the excess of N-methyl-2-pyrrolidone which is not contained in the crystal and which shows reflections at X-ray diffraction angles (2θ) of 11,5°, 13.5°, 16.2°, 18.3°, 22.0°, 24.4° and 26.0°.

6. The crystalline complex of claim 1, which consists essentially of an aromatic polyamide and ε-caprolactam and which shows reflections at X-ray diffraction angles (2θ) of 9.0°, 11.8°, 17.9°, 19.8°, 23.3°, 24.5° and 28.7°.

7. The crystalline complex of claim 1, which is produced by contacting an aromatic polyamide with ε-caprolactam to form a crystalline complex and then removing the excess of ε-caprolactam which is not contained in the crystal and which shows reflections at X-ray diffraction angles (2θ) of 9.0°, 11.8°, 17.9°, 19.8°, 23.3°, 24.5° and 28.7°.

8. The crystalline complex of claim 1, which consists essentially of the aromatic polyamide and 2-pyrrolidone and which shows reflections at X-ray diffraction angles (2θ) of 11.0°, 17.4°, 18.4°, 20.2°, 21.0°, 23.2°, 25.0°, 26.2° and 27.4.

9. The crystalline complex of claim 1, which is produced by contacting the aromatic polyamide with 2-pyrrolidone to form a crystalline complex and then removing the excess of 2-pyrrolidone which is not contained in the crystal and which shows reflections at X-ray diffraction angles (2θ) of 11.0°, 17.4°, 18.4°, 20.2°, 21.0°, 23.2°, 25.0°, 26.2° and 27.4°.

10. A method for producing a crystalline complex, which comprises contacting an aromatic polyamide with at least one member selected from the group consisting of hexamethylphosphoric amide, N-methylpyrrolidone, ε-caprolactam and 2-pyrrolidone to form a crystalline complex, which consist essentially of an aromatic polyamide and from 0.3 to 2.5 moles of at least one member selected from the group consisting of hexamethylphosphoric amide, N-methyl-2-pyrrolidone, ε-caprolactam and 2-pyrrolidone per mole of said aromatic polyamide, at least 75 mol % of repeating unit of said aromatic polyamide being m-phenyleneisophthalamide, wherein said crystalline complex has a maximum melting point of 156° C; and then removing the excess of hexamethylphosphoric amide, N-methylpyrrolidone, ε-caprolactam, or 2-pyrrolidone which is not contained in the crystal.

11. The method of claim 10, which comprises contacting the aromatic polyamide (A) with at least one member selected from the group consisting of hexamethylphosphoric amide, N-methylpyrrolidone, ε-caprolactam and 2-pyrrolidone (B) at a molar ratio (B)/(A) of at least 1 and a weight ratio (B)/(A) of not more than 10 at a temperature of 25°–150° C for 3 minutes – 60 hours.

12. The method of claim 10, wherein an excess of hexamethylphosphoric amide, N-methylpyrrolidone, ε-caprolactam of 2-pyrrolidone which is not contained in the crystal is removed by centrifuging.

13. The method of claim 10, wherein the excess hexamethylphosphoric acid amide, N-methylpyrrolidone, ε-caprolactam or 2-pyrrolidone which is not contained in said crystal is removed by filtration.

14. The method of claim 10, wherein the excess hexamethylphosphoric acid amide, N-methylpyrrolidone, ε-caprolactam or 2-pyrrolidone which is not contained in said crystal is removed by distillation at a temperature of less than 150° C.

15. The method of claim 10, wherein the excess hexamethylphosphoric acid amide, N-methylpyrrolidone, ε-caprolactam of 2 -pyrrolidone which is not contained in said crystal is removed by concentrating at temperature lower than 150° C.

16. A binder for a non-woven fabric or paper product comprising a crystalline complex having a maximum melting point of about 156° C which consists essentially of an aromatic polyamide and from 0.3 to 2.5 moles of at least one member selected from the group consisting of hexamethylphosphoric amide, N-methyl-2-pyrrolidone, ε-caprolactam and 2-pyrrolidone per mole of said aromatic polyamide, at least 75 mol % of repeating unit of said aromatic polyamide being m-phenyleneisophthalamide.

17. A fiber or film obtained by melt extruding a crystalline complex having a maximum melting point of about 156° C which consists essentially of an aromatic polyamide and from 0.3 to 2.5 moles of at least one member selected from the group consisting of hexamethylphosphoric amide, N-methyl-2-pyrrolidone, ε-caprolactam and 2-pyrrolidone per mole of said aromatic polyamide, at least 75 mol % of repeating unit of said aromatic polyamide being m-phenyleneisophthalamide.

18. A filter medium from the crystalline complex having a maximum melting point of about 156° C which consists essentially of an aromatic polyamide and from 0.3 to 2.5 moles of at least one member selected from the group consisting of hexamethylphosphoric amide, N-methyl-2-pyrrolidone, ε-caprolactam and 2-pyrrolidone per mole of said aromatic polyamide, at least 75 mol % of repeating unit of said aromatic polyamide being m-phenyleneisophthalamide.

* * * * *